Jan. 26, 1965  A. M. MARKS ETAL  3,167,607
MULTI-ELEMENT ELECTRO-OPTIC CRYSTAL SHUTTER
Filed Jan. 11, 1960  3 Sheets-Sheet 1
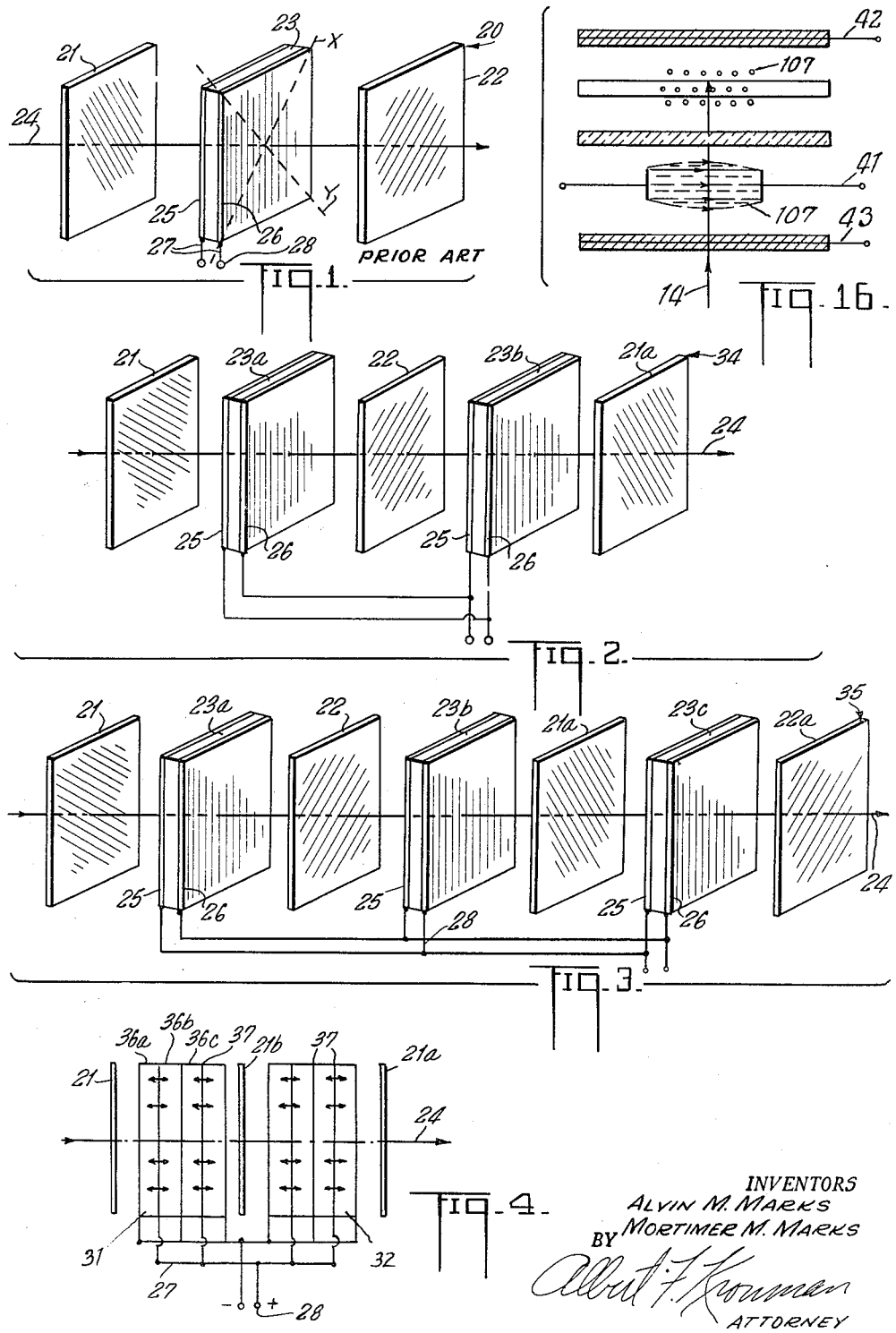
INVENTORS
ALVIN M. MARKS
MORTIMER M. MARKS
BY
ATTORNEY

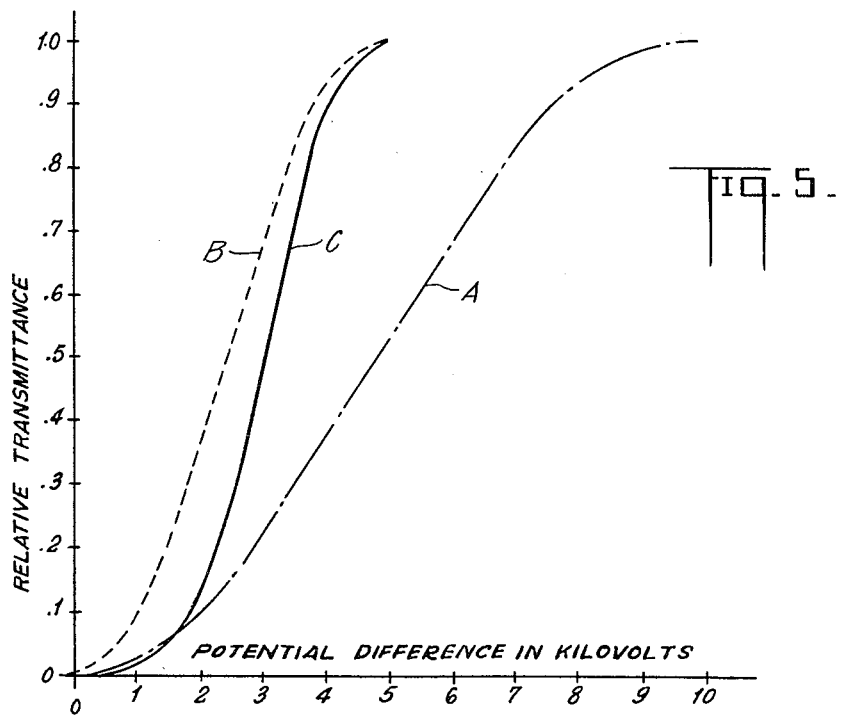
Fig. 5.
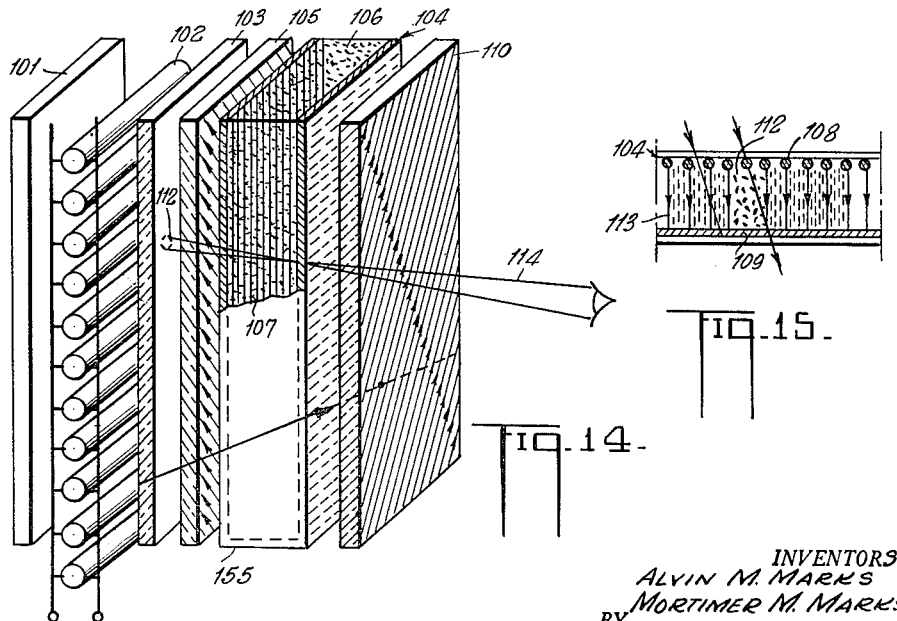
Fig. 14.
Fig. 15.
INVENTORS
ALVIN M. MARKS
MORTIMER M. MARKS
BY Albert F. Kronman
ATTORNEY

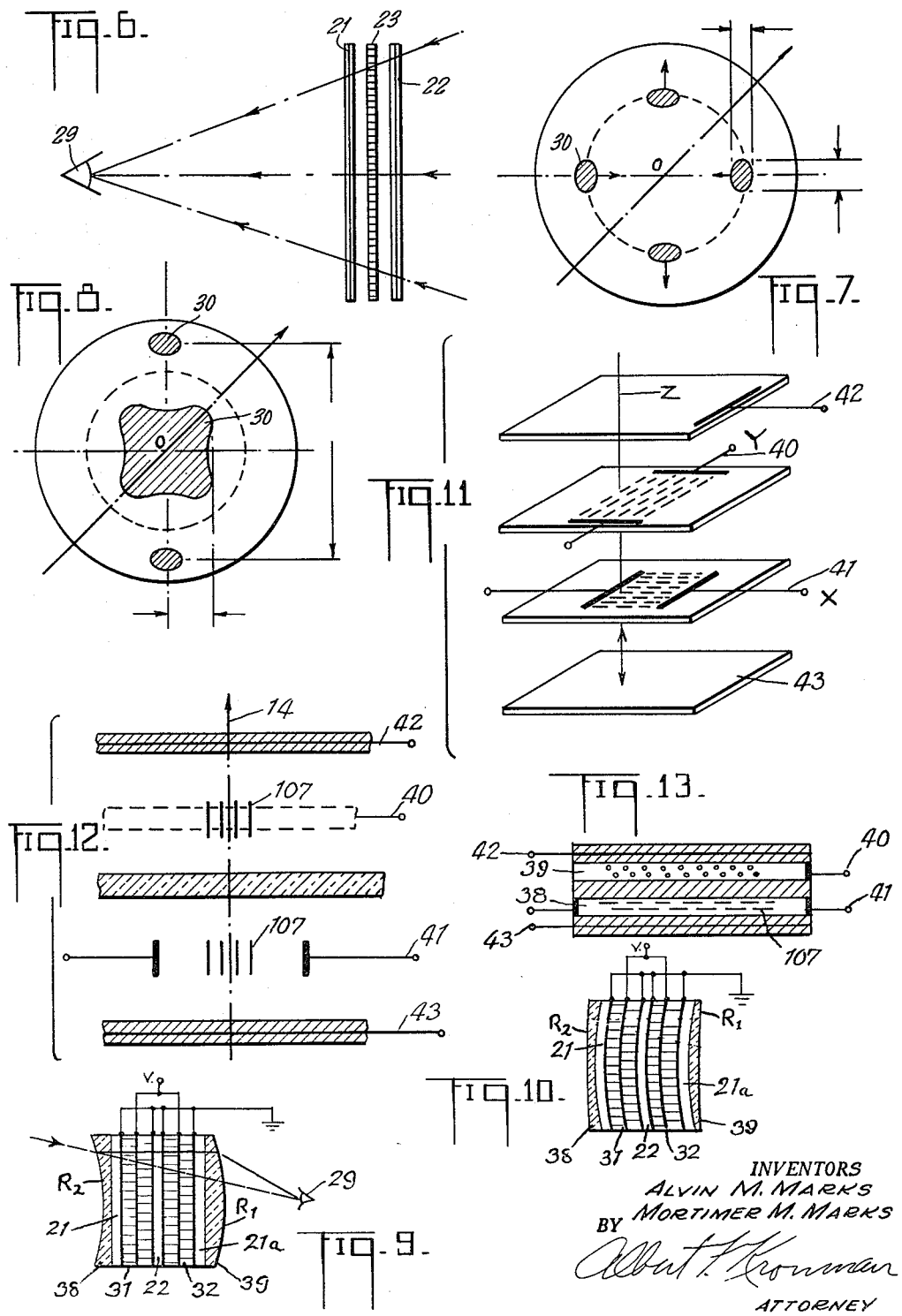

United States Patent Office 3,167,607
Patented Jan. 26, 1965

3,167,607
MULTI-ELEMENT ELECTRO-OPTIC
CRYSTAL SHUTTER
Alvin M. Marks, 149—61 Powells Cove Blvd., and
Mortimer M. Marks, 166—25 Cryders Lane, both of
Whitestone, N.Y.
Filed Jan. 11, 1960, Ser. No. 1,782
5 Claims. (Cl. 88—61)

This invention relates to electro-optic devices such as are used to control the passage of light therethrough, and is a continuation-in-part of an application for patent entitled Screen for Producing Television Images and Method, filed January 14, 1954, Serial No. 404,027, now Patent No. 2,921,129, issued January 12, 1960.

It has been known in the prior art to construct an electro-optic shutter, using a "Z" cut crystal plate of a thickness between .015″ and .100″ from uniaxial electro-optically active crystals, such as ammonium dihydrogen phosphate (ADP), potassium dihydrogen phosphate (KDP), potassium dihydrogen arsenate (KDA). Zinc sulphide and other crystals of this nature have also been suggested for this purpose.

Upon the application of a voltage between transparent electrodes attached to opposing "Z" cut crystal faces, a half wave retardation takes place which rotates the plane of polarization through 90°. For example, with ADP the application of 9600 volts produces a half wave retardation. With KDP approximately 7500 volts is required, and with KDA only about 6700 volts is required to obtain the same half wave retardation. Moreover, the angular aperture with KDA is approximately 10% larger than with ADP.

Crystals of a suitable nature such as have been herein mentioned are at present only available in small sizes. In addition, the high voltage necessary to produce a half wave retardation, which is approximately 9,600 volts for green light with ADP crystals tends to crack and destroy larger crystals of ADP. The application of the voltages to the ADP crystals also causes deformation by the piezo electric action of said voltage.

A further difficulty of prior art devices is the narrow angular field of view which is about 2½° for a half angular field of .080″ thick crystal in a normally closed position.

When a device made in accordance with the prior art, namely, a crystal cut normal to the "Z" axis with an electric field applied thereto parallel to the "Z" axis and held between crossed polarizers, is held near the eye of an observer an interference pattern will be superimposed upon the field of view. Moreover, the requirement for a failsafe device which will be transparent with a zero voltage applied, and opaque with a full voltage applied cannot be met, because with a full voltage applied to the prior art structure the opacity is not complete and the opaque area is limited to a small region in the center of the lens.

It has also been suggested to substitute for the crystals in an electrically controlled shutter, an enclosure of large area but thin cross-sectional dimensions in which there is carried a suspension of dipole particles and to orient the said particles normal to the surface of the enclosure to produce transparency. The particles are allowed to become disoriented through normal relaxation to produce opacity. However, it has been found that the relaxation time of such a structure is comparatively long because to animate the dipole particles to bring about their relaxation and disorientation, Brownian Motion has been used which, for particles of the size required, that is, of the order of 100 to 200 millicrons is relatively weak. When subjected to a strong electric field, the dipole particles can be caused to align quite rapidly.

Accordingly, it is an object of the present invention to provide an electro-optic device in the nature of a shutter or the like, which will not be destroyed by the application of the voltage thereto, necessary to bring about the operation of the said device.

Another object of the present invention is to provide an electro-optic device in the form of a lens which may be used as a variable density lens of wide angular aperture under the control of applied electrical voltage.

Still another object of the present invention is to provide an electro-optic shutter which will be a failsafe device, transparent with a zero voltage applied, and opaque with a full voltage applied.

Still another object of the present invention is to provide a dipole shutter capable of extinction at extremely high speeds and also capable of being placed in a transparent state by the application of voltages thereto.

A feature of the present invention is its use of a plurality of "Z" cut crystal plates having conductive coatings on each face thereof. Another feature of the present invention is the application of a portion of the total voltage necessary to bring about the half wave retardation within the plates to each of the faces of the plurality of plates.

Another feature of the present invention is its use of lenses by means of which the blackout area produced within the crystal can be made to cover the entire field of view.

Still another feature of the present invention is the use of lenses ground into the surface of the crystals normal to the "Z" axis of the said crystals to compensate for the differences in path lengths and differences in birefringence whereby the central blackout spot diameter within the crystals can be increased to cover the entire aperture of the lens.

The invention consists of the construction, combination, arrangement of parts and the steps of the method as herein illustrated, described and claimed.

In the accompanying drawings, forming part hereof, are illustrated several forms of embodiment of the invention, in which drawings similar reference characters designate corresponding parts and in which:

FIGURE 1 is a somewhat exploded view in perspective of a conventional electro-optic shutter employing the parallel electro-optic effect.

FIGURE 2 is a somewhat exploded view in perspective of a two-section electro-optic shutter according to the present invention.

FIGURE 3 is a somewhat exploded view in perspective of a three-section electro-optic shutter.

FIGURE 4 is a somewhat diagrammatic vertical section of a modification of the two-section shutter whereby lower operating voltages may be employed.

FIGURE 5 is a graphical representation showing the operating characteristics of certain shutters herein described.

FIGURE 6 is a somewhat diagrammatic view showing converging light rays passing through a crystal mounted between two polarizers disposed with their axis of polarization parallel to each other.

FIGURE 7 is a view in front elevation showing the appearance of the field of the electro-optic shutter with zero voltage.

FIGURE 8 is a view similar to FIGURE 7 showing the appearance of the field with 9,600 volts across one crystal only, or with 4,800 volts across a pair of crystals.

FIGURE 9 is a cross-sectional view taken through an electro-optic shutter showing the use of lenses for increasing the area covered by the blackout of the field.

FIGURE 10 is a cross-sectional view of an electro-optic shutter in which the crystal plates are themselves ground to form lenses for the purpose of producing a blackout across the entire field of the shutter.

FIGURE 11 is a somewhat diagrammatic exploded view showing an electrically controlled dipole shutter, made in accordance with the present invention.

FIGURE 12 is a diagrammatic cross-sectional view of the shutter shown in FIGURE 11.

FIGURE 13 is a view similar to FIGURE 12 shown in an assembled state.

FIGURE 14 is a diagrammatic view in perspective of a further embodiment of an electrically controlled dipole shutter.

FIGURE 15 is a fragmentary view in cross-section of a portion of a dipole shutter showing the manner in which a selected portion thereof may be controlled.

FIGURE 16 is a view similar to FIGURE 12 showing the shutter in its light blocking condition.

Referring to the drawings and particularly to FIGURE 1, there is shown a prior art electro-optic shutter 20 having two polarizing sheets 21, 22, disposed with their polarizing axes at right angles to each other. The polarizing axes are indicated by the shading lines, 21 and 22. A transparent PN(ammonium dihydrogen phosphate crystal) 23, or some other suitable crystal such as hereinabove referred to is interposed between the polarizers 21, 22. The crystal 23 has its "Z" or optical axis coincident with a beam of light 24, directed at the said crystal plate 23. The beam of light 24 is normal to the said crystal 23. The "Y" axis of the crystal plate 23 is parallel to the polarizing axis of the sheet 21. Transparent electrodes 25, 26, or conductive coatings, are mounted upon the faces of the crystal plate 23. Conductors 27 are attached to the electrodes 25, 26, said conductors 27 ending in terminals 28.

Since the polarizing axes of the sheets 21, 22, are at right angles to each other, light 24 directed at the rear of sheet 21 will not be able to pass through sheet 22. However, if an electric field be applied to the faces of the crystal plate 23, the light from the first sheet 21, upon entering the plate 23, will be caused to rotate its plane of polarization, thus allowing passage of light through the second sheet 22, which will then become visible.

The response characteristics of the two-section shutter 34 shown in FIGURE 9, is shown as curve C in FIGURE 5. As may be seen from an examination of this curve, approximately 1,500 volts is required to reach the knee of the response characteristic curve. Until this voltage is reached practically no light will be transmitted through the shutter. The response characteristic curve A of a single section shutter is also shown on the graph in FIGURE 5. The single crystal curve rises more gradually than that of a two-crystal shutter (FIG. 5 curves B and C). The single-section shutter is illustrated in FIGURE 1. In FIGURE 4 there is shown a further modification of the two-section shutter 34 shown in FIGURE 2. This construction comprises a plurality of crystal plates 36a, 36b, 36c, etc., respectively interleaved with transparent electrodes 37, connected as shown. This construction is similar to that of a pile condenser in which the condenser plates comprise transparent electrodes 37 which are interleaved with the crystal plates 36a, 36b, 36c, etc. By reversing the direction of the electric field within adjacent crystal plates, as indicated by the arrows, it is possible to obtain a much lower operating voltage than that required in FIGURE 2. Thus, for example, with four crystal plates per section shown in FIGURE 4, in place of the single crystal plate per section 23a, 23b, shown in FIGURE 2, the operating voltage is ¼ that shown in FIGURE 2.

The polarizers 21, 22 and 21a, 22a shown in FIGURES 2 and 3 are disposed so that alternating polarizers have their angle of polarization normal to each other. Such shutters will be opaque or closed when no voltage is applied to the crystal plates 23a, 23b and 23c. However, it is within the purview of the present invention to have the polarizing plates 21, 22, 21a and 22a disposed with their axes of polarization parallel to each other in which case the shutter would be open when no voltage was applied to the crystal plates 23a, 23b and 23c. Thereafter, the plane of polarization may be rotated through 90° by the application of the voltage and the shutter caused to become opaque.

When a uniaxial crystal plate cut normal to the optical axis, such as an ADP, KDP or KDA crystal, is placed between two polarizers set for extinction, a dark central spot appears with an angular aperture of approximately 2° for an ADP crystal plate of thickness .080 inch. When the same crystal is placed between parallel polarizers four small dots, such as are shown in FIGURE 7, may be observed.

In electro-optic shutters made according to the prior art it is necessary that the eye be located approximately 14" from the shutter in order to obtain a uniform blackout effect over the entire crystal surface. At this distance the central dark spot has expanded to cover the entire field of view. However, if such a crystal plate is held within a few inches of the eye the central spot appears to be ⅛" to ¼" in diameter. Such a small area is obviously useless for the purpose of an opthalmic type lens to be placed in front of the eye. However, by means of the structures hereinafter more fully described it is possible to provide an opaque spot which will cover the entire area of a spectacle lens when placed a few inches from the eye. Such a device would be useful, for example, for the protection of the eyes of the wearer against bright flashes of light such as may be caused by atomic explosion, by causing the lens to become opaque within a few micro-seconds after the onset of the flash.

In FIGURE 6 there is shown the converging of light rays passing through the crystal 23 mounted between two polarizers parallel to the eye 29 of an observer. If the polarizers are disposed with their axes of polarization parallel to each other the interference pattern shown in FIGURE 7 will be observed. Four dots 30 will appear in the field when the assembly is held 3" from the eye. This corresponds to a cone of convergent light entering the pupil of the eye 29 through the lens. When a voltage of 9,600 volts is applied to the prior art devices or 4,800 volts to the present device, a pair of dots 30 converge and coalesce in the center of the field. The other dots 30 diverge slightly as shown in FIGURE 8. In order to enhance this effect the device shown in FIGURE 4 may be employed. In this device 3 polarizers 21, 21a, 21b with all their polarizing axes parallel are employed. Between the polarizers, 21, 21a, 21b are placed two pairs of crystal plates such as are shown in FIGURES 9 and 10. Each pair of crystal plates is connected to function at 4,800 volts being one half the voltage required for operating the crystal applied to the conductive coatings 25, 26 disposed over the inner and outer faces of the laminated crystal pairs. Since electro-optic effects are additive and are independent of the direction of the voltage through the crystal one-half the total voltage necessary can be applied across each of the crystals with the result that the crystals will not be destroyed despite repeated use thereof. The first pair of crystals 31 is placed with the bi-axial plane of its optic axis at +45° and the second pair of crystals 32 is placed with its bi-axial plane of optic axis at −45° to the plane of polarizing of the polarizers 21, 21a, 21b.

When a voltage of 4,800 volts is applied simultaneously across the two pairs of crystals 31, 32 the four dots which appeared at 0 voltage simultaneously converge at the center of the field to form an extremely dark or opaque area. The half angular aperture of the field is increased by a factor of about three times (average value). The consideration of the voltage transmission curves through the device will be helpful and may be observed from an examination of FIGURE 5. The curve A shows a voltage transmission curve for the prior art device consisting of a single crystal between two polarizers (FIGURE 1) and given by the following equation:

$$T = \sin^2 (\pi/2)(V/9600) \tag{1}$$

Where $T$ = relative transmission
$V$ = applied voltage across crystal

Curve No. B shows the effect of utilizing a pair of crystals with the voltage split between them. The effect of this is shown by the following equation:

$$T = \sin^2(\pi/2)(V/4800)$$

The effect of using two pairs of crystals with their biaxial plane of the optic axes at plus and minus 45° respectively to the polarizing axes, and sandwiching these two pairs of crystals between three polarizers with their polarizing axes, parallel is shown in curve No. C and given by the following equation:

$$T = \sin^4(\pi/2)(V/4800) \quad (3)$$

For the general case the equation for $n$ polarizers and $N/n-1$ crystals is:

$$T = \sin^{2(n-1)}(\pi/2)[VN/(n-1)V\max.] \quad (4)$$

Where $n$ = number of polarizers
$N$ = number of crystals
$N/n-1$ = number of crystals between each adjacent polarizer Assuming perfectly transparent electrodes, the transmission of three polarizers parallel may be presently taken as 30% for zero voltage, and as less than .01% for 4,800 volts applied. This is only possible because of the new structure employed. The extinction with the prior art device was only about 1%, but with the present structure this value is now 1% of 1% or .01%.

Referring to FIGURES 9 and 10 there is shown a structure by means of which the aperture of the system has been increased even further by employing a combination of a positive and negative lens and placing the eye of the observer at the focal point of the positive lens. As a result, the rays traversing the crystal are substantially parallel.

The positive and negative lens curvatures are so chosen that combined with the total thickness of the composite structure a zero power lens results. It will be understood that the direction of the field of the voltage is reversed in adjacent crystals in the embodiment shown in FIGURES 9 and 10 in the same manner that it is illustrated in FIGURE 4. Referring to FIGURE 10 there is shown an electro-optic shutter similar to FIGURE 9 in which the crystal plates 31, 32 are curved as by grinding and polishing and the polarizers 21, 22, are also curved to conform to the shape of the crystal. Negative and positive lenses 38, 39 are fitted to the front and back of the shutter respectively as shown and are laminated to the curved surfaces therebetween. In all other respects the embodiment of FIGURE 10 corresponds to that of FIGURE 9. The first lens or negative lens 38 will be observed in FIGURE 10 to be a concave meniscus lens and the rear lens 39 will be a convex meniscus lens. The lenses used for this purpose are preferably made of a high index of refraction material such as glass having an index of between 1.8 and 2.5. The high index material results in a reduction of the focal length and makes it possible to achieve a wide aperture system.

The pair of crystals 31 are cemented together with the biaxial optical axis which is induced by the electrical field in each crystal parallel to each other. However, successive pairs of crystals while put together in the same way are disposed as a pair of crystals so that their biaxial optical axes are at right angles to adjacent pairs of crystals. In this manner a larger opaque field is achieved. The combination of the negative and positive lens shown in FIGURES 9 and 10 amounts to an optical system of zero power and the radius $R_2$ comprising the first radius of the negative lens is greater than the power of the radius $R_1$ comprising the rearmost radius of the positive lens in order to compensate for lens thickness according to well known optical theories. In this manner the ray angle through the crystal is maintained approximately zero and the spot diameter as shown in FIGURE 8 expands to cover the complete diameter of the electro-optic device.

Another form of shutter according to this invention is shown schematically in FIGURE 14. A light reflecting surface 101 is positioned behind the electro-optic shutter. Immediately in front of the reflector 101 are a plurality of high intensity illuminants 102. The light from the illuminants 102 is converted into a uniform field by a diffusing plate 103 which is placed between the illuminants 102 and the shutter 104. The diffused light emanating from the plate 103 is polarized by a suitable polarizing sheet 105 before it enters the shutter 104.

The body of this form of shutter is in the shape of a thin rectangular transparent tank 155. Within the tank 155 there may be contained a liquid 106. The liquid 106 contains suitable transparent birefringent elongated dipole particles 107. The length of these particles 107 is critical.

A maximum dipole particle length is desired to increase the dipole moment, to enable easy alignment by means of weak electric fields. The birefringent effect, moreover, is increased in the thicker and longer particles 107. On the other hand, the particle length must not exceed a given size, since the relaxation time must be sufficiently small to provide an adequate response to the control signals. Moreover, the width of the particles must not be great enough to cause substantial light scattering when the light is passing approximately parallel to the axis of the aligned particles 107.

Such requirements are met by colloidal suspensions of anisotropic, birefringent, elongated, dipole particles of substances which have an inherently large dipole moment. These colloidal particles may preferably be suspensions of crystallites in a suitable liquid. The crystallites may be obtained from a widely dispersed class of organic or inorganic chemical compounds; for example; meconic acid, quinine sulphate, certain protein crystallites, quartz, etc. In addition to colloidal suspensions of transparent birefringent crystallite dipole particles, the liquid 106 may comprise a dilute solution, in any suitable solvent such as water, alcohol, etc. of a substance having an elongated molecular structure. This substance must also have a large electric dipole moment and birefringent effect, when a plurality of its molecules are suitably aligned in an electric or magnetic field. Such substances include the class known to form "liquid crystals" in molten, or concentrated solution, and which may exist in the smectic or nematic state. An example of a substance belonging to the class of liquid crystals, is p-azoxyanisol. Many other such well known substances may be alternatively employed.

The front and rear inner surfaces of the shutter 104 are latticed by a plurality of wires 108, 109, which comprise two distinct series of gratings (see FIGURE 15). The rear grating 108 is formed of spaced vertical wires. The front grating 109 is formed of spaced horizontal wires. The wires which are formed into the gratings 108, 109 are small in diameter compared to the distance therebetween, and consequently will cause a minimum of interference with the passage of light through the shutter 104. The cutaway section shown in FIGURE 11 is therefore exaggerated as to the relative size of the wires and width of the tank 155, for the purpose of clarity of illustration.

A polarizing sheet 110 is placed in front of the shutter 104. The plane of polarization of the sheet 110 is at right angles to that of the opposed polarizer 103 located behind the shutter 104. In this manner, all the light which enters the shutter 104 from the illuminants 102 is ordinarily absorbed by the second of the crossed-polarizers 110; hence the observer 111 sees only an opaque shutter. However, light passing through region 112 is rotated or depolarized, as hereinafter decsribed, and is thus enabled to pass through the second polarizer 110. The intensity of the light passing through the region 112 may be modulated by an intensity signal voltage $e_i$ applied to the bank of illuminants 102.

The above mentioned birefringent particles ordinarily may be aligned normal to the plane of the gratings 108, 109 by an electrical field 113 applied between the said gratings (see FIGURE 15). Under these conditions the polarized light 114 from the polarizer 105 (the plane of polarization of which may be at 45° to the horizontal) traverses a path approximately parallel to the long (optic) axis of the particles 107 except in passing through the region 112. Thus there will be no relative retardation between the horizontal and the vertical components, or depolarization of the polarized light 114 except in passing through the region 112.

However, since the electrical field may be reduced to zero as by shorting the wires adjacent thereto within the region 112, the particles 107 within the region will quickly become disoriented. Some of the disoriented birefringent particles will have the effect of randomly rotating the plane of polarization, and hence of depolarizing the light. The result of a rotation or depolarization of the divergent rays of light 114, in passing through region 112 is to enable a substantial portion of the rays 114 to pass through the second polarizer 110; whereas, other light rays 115 from elsewhere within the shutter are blocked by the polarizer 110.

Thus, a modulated spot of light at region 112 will appear.

The shutters set forth and described in connection with FIGURES 14 and 15 while satisfactory for certain purposes are, nevertheless, slow to achieve relaxation following orientation of the dipoles. Accordingly, the assembly shown in FIGURES 7, 8, 13 and 16, has been provided.

In this embodiment a series of cells best shown in FIGURE 13 at 38, 39, are provided. These cells are filled with a herapathite suspension consisting of a plurality of dipole particles 107 which may be aligned by means of an electric field applied to the said cells. In addition to alignment in a plane normal to the surface of the cells such as is shown in FIGURE 8, additional electrodes 40, 41 are provided for orienting the dipoles parallel to the surface of the cells 38, 39. When the dipoles in the cells 38, 39 are aligned parallel to the "Z" axis of the shutter as shown in FIGURE 12 light 14 entering the shutter will traverse the shutter and the structure will be transparent. Thereafter, one of the cells 39 may be impressed with an electrical field along the "Y" axis of the cell and the other cell 39 impressed with a field along the "X" axis of the cell, both axes being normal to the "Z" axis but being normal to each other. The cell then operates as crossed polarizers to absorb all light entering therein as illustrated in FIGURE 16. By utilizing electric switching a speed response from transparent to opaque and from opaque to transparent can be achieved in a time of the order of 1 micro-second.

Having thus fully described the invention what is claimed as new and desired to be secured by Letters Patent of the United States, is:

1. An electro-optic device comprising a plurality of substantially flat plate-like electro-optic crystals disposed along an optical axis and having their major surfaces in parallel alignment in planes perpendicular to said optical axis, a light polarizing member on each outer major face of said crystals, a transparent electrically conductive film on each major face of said crystals and means including a first lead connected to alternate conductive films and a second lead connected to the remaining films to produce between the conductive films of the crystals an electrical potential difference sufficient to cause a retardation of the light passing through the said crystals whereby the potential difference applied between any two adjacent conductive films is less than the total potential difference necessary to effect the said retardation, a negative lens laminated to the entrant side of the device and a positive lens of substantially compensating power laminated to the exit side of the device whereby a cone of light entering the device will pass therethrough parallel to the optical axis of the device and be brought to the focal point of the positive lens surface on the exit side of the device.

2. An electro-optic device comprising a plurality of substantially flat plate-like electro-optic crystals disposed along an optical axis and having their major surfaces in parallel alignment in planes perpendicular to said optical axis, a light polarizing member on each outer major face of said crystals, a transparent electrically conductive film on each major face of said crystals and means including a first lead connected to alternate conductive films and a second lead connected to the remaining films to produce between the conductive films of the crystals an electrical potential difference sufficient to cause a retardation of the light passing through the said crystals whereby the potential difference applied between any two adjacent conductive films is less than the total potential difference necessary to effect the said retardation, a negative concave meniscus lens laminated to the entrant side of the device and a positive convex lens of substantially compensating power laminated to the exit side of the device whereby a cone of light entering the device will pass therethrough parallel to the optical axis of the device and be brought to the focal point of the positive lens surface on the exit side of the device.

3. An electro-optic device according to claim 1 in which all of the crystals and polarizers are curved to conform to and nest with the said lenses.

4. An electro-optic device comprising a plurality of substantially flat, plate-like electro-optic crystals disposed along an optical axis and having their major surfaces in parallel alignment in planes perpendicular to said optical axis, said crystals being secured together to form pairs of crystals, a light receiving and light transmitting face on each of the crystal pairs, a light polarizer interleaved between adjacent crystal pairs and a light polarizer adjacent the outer faces of the outermost crystal pairs, a transparent conductive electrode between each of the crystals forming the pairs, a transparent conductive electrode on the light receiving and light transmitting face of each crystal pair, successive pairs of crystals being disposed so that the biaxial optical axes induced therein by an electric field applied thereto are at right angles to each other and adjacent crystals forming each pair have parallel induced biaxial optical axes, and means including a first lead connected to alternate conductive electrodes and a second lead connected to the remaining electrodes to produce between the conductive electrodes of the crystals an electrical potential sufficient to cause a half-wave retardation of the light passing through the said crystals whereby the potential difference applied between any two adjacent conductive electrodes is less than the total potential difference necessary to effect the said half-wave retardation.

5. An electro-optic device comprising a plurality of substantially flat plate-like electro-optic crystals disposed along an optical axis and having their major surfaces in parallel alignment in planes perpendicular to said optical axis, a light polarizing member on each outer major face of said crystals, at least one light polarizing member interleaved between said crystals, a transparent electrically conductive film on each major face of said crystals and means including a first lead connected to alternate conductive films and a second lead connected to the remaining films to produce between the conductive films of the crystals an electrical potential difference sufficient to cause a retardation of the light passing through the said crystals whereby the potential difference applied between any two adjacent conductive films is less than the total potential difference necessary to effect the said retardation, a negative lens laminated to the entrant side of the device and a positive lens of substantially compensating power laminated to the exit side of the device whereby a cone of light entering the device will pass therethrough parallel to the optical axis of the device and be brought to the focal point of the positive lens surface on the exit side of the device.

References Cited in the file of this patent

UNITED STATES PATENTS

| | | |
|---|---|---|
| 2,467,325 | Mason | Apr. 12, 1949 |
| 2,600,962 | Billings | June 17, 1952 |
| 2,649,027 | Mason | Aug. 18, 1953 |
| 2,670,402 | Marks | Feb. 23, 1954 |
| 2,766,659 | Baerwald | Oct. 16, 1956 |
| 2,780,958 | Wiley | Feb. 12, 1957 |